US009317934B2

(12) United States Patent
Sunwoo et al.

(10) Patent No.: US 9,317,934 B2
(45) Date of Patent: Apr. 19, 2016

(54) METHOD AND APPARATUS FOR ESTIMATING MOTION (71) Applicants: Myung Hoon Sunwoo, Seoul (KR); Ho Il Bang, Gyeonngi-do (KR)

(72) Inventors: Myung Hoon Sunwoo, Seoul (KR); Ho Il Bang, Gyeonngi-do (KR)

(73) Assignee: AJOU UNIVERSITY INDUSTRY COOPERATION FOUNDATION, Gyeonggi-Do (KR)

( * ) Notice: Subject to any disclaimer, the term of this patent is extended or adjusted under 35 U.S.C. 154(b) by 207 days.

(21) Appl. No.: 14/355,095

(22) PCT Filed: Oct. 19, 2012

(86) PCT No.: PCT/KR2012/008575
§ 371 (c)(1),
(2) Date: Apr. 29, 2014

(87) PCT Pub. No.: WO2013/065977
PCT Pub. Date: May 10, 2013

(65) Prior Publication Data
US 2014/0301656 A1 Oct. 9, 2014

(30) Foreign Application Priority Data

Nov. 1, 2011 (KR) .................. 10-2011-0112897

(51) Int. Cl.
*H04N 7/50* (2006.01)
*G06T 9/00* (2006.01)
(Continued)

(52) U.S. Cl.
CPC .............. *G06T 9/00* (2013.01); *H04N 19/105* (2014.11); *H04N 19/119* (2014.11); *H04N 19/154* (2014.11); *H04N 19/176* (2014.11); *H04N 19/436* (2014.11); *H04N 19/56* (2014.11)

(58) Field of Classification Search
CPC ..... H04N 7/50; H04N 7/26244; H04N 5/145; H04N 7/26765; H04N 7/26015; H04N 19/176; H04N 19/187; H04N 19/44; H04N 19/52; H04N 19/70; H04N 19/124; H04N 19/513; H04N 19/593; H04N 19/136; H04N 19/172; H04N 19/184; H04N 19/61; H04N 19/30; H04N 19/597; H04N 19/10
See application file for complete search history.

(56) References Cited

U.S. PATENT DOCUMENTS

| 7,499,492 | B1 * | 3/2009 | Ameres | H04N 7/50 341/65 |
| 7,620,104 | B2 | 11/2009 | Byun | 375/240.03 |

(Continued)

FOREIGN PATENT DOCUMENTS

| KR | 10-2005-0074012 | 7/2005 |
| KR | 10-2008-0091651 | 10/2008 |

(Continued)

OTHER PUBLICATIONS

International Search Report (ISR) in PCT/KR2012/008575, dated Mar. 4, 2013.

*Primary Examiner* — Sath V Perungavoor
*Assistant Examiner* — Howard D Brown, Jr.
(74) *Attorney, Agent, or Firm* — Harness, Dickey & Pierce, P.L.C.

(57) ABSTRACT

Provided are a motion estimation method and a motion estimation apparatus. The motion estimation apparatus includes a first register storing information on whether to detect first detection positions, a second register storing information on distances and number information of valid distance information, a controller receiving a command, a shifter, in response to the shift-enable signal, shifting and outputting reference data in a detection region of a reference frame and outputting the received reference data as it is, a selector, in response to the selection signal, selecting and outputting a part of output data of the shifter or outputting the whole output data, a process element (PE) array receiving current data of a current frame, and a comparator generating operation results for respective block sizes using operation results of the plurality of the PEGs.

16 Claims, 7 Drawing Sheets

(51) Int. Cl.
*H04N 19/56* (2014.01)
*H04N 19/105* (2014.01)
*H04N 19/176* (2014.01)
*H04N 19/119* (2014.01)
*H04N 19/154* (2014.01)
*H04N 19/436* (2014.01)
*H04N 7/26* (2006.01)

(56) References Cited

U.S. PATENT DOCUMENTS

| | | | |
|---|---|---|---|
| 8,345,764 B2 | 1/2013 | Zhan et al. | 375/240.16 |
| 2001/0048757 A1* | 12/2001 | Oosawa | G06T 7/0026 382/130 |
| 2003/0010895 A1* | 1/2003 | Kimura | H04N 9/045 250/208.1 |
| 2008/0126278 A1* | 5/2008 | Bronstein | G06T 7/2006 706/17 |
| 2008/0192985 A1* | 8/2008 | Shimazu | H04N 5/144 382/107 |
| 2009/0231447 A1* | 9/2009 | Paik | G01S 3/7864 348/208.4 |
| 2009/0252230 A1* | 10/2009 | Zhan | H04N 19/43 375/240.16 |
| 2011/0037895 A1* | 2/2011 | Poon | H04N 5/144 348/453 |
| 2011/0293012 A1* | 12/2011 | Au | H04N 19/52 375/240.16 |
| 2012/0318870 A1* | 12/2012 | Ren | H04N 9/045 235/469 |

FOREIGN PATENT DOCUMENTS

| | | |
|---|---|---|
| KR | 10-2009-0102646 | 9/2009 |
| KR | 10-2009-0105365 | 10/2009 |

* cited by examiner

| LINE | SP | D0 | D1 | D2 | D3 | D4 | D5 | D6 | D7 |

| LINE 0 | 4 | 0 | 4 | 8 | 12 | 0 | 0 | 0 | 0 |
| LINE 1 | 0 | 0 | 0 | 0 | 0 | 0 | 0 | 0 | 0 |
| LINE 2 | 0 | 0 | 0 | 0 | 0 | 0 | 0 | 0 | 0 |
| LINE 3 | 4 | 0 | 4 | 8 | 12 | 0 | 0 | 0 | 0 |

240

| | PEG 0 | PEG 1 | PEG 2 | PEG 3 | PEG 4 | PEG 5 | PEG 6 | PEG 7 |

METHOD AND APPARATUS FOR ESTIMATING MOTION

CROSS-REFERENCE TO RELATED APPLICATIONS

This application is a national phase application of PCT Application No. PCT/KR2012/008575, filed on Oct. 19, 2012, which claims the benefit and priority to Korean Patent Application No. 10-2011-0112897, filed Nov. 1, 2011. The entire disclosures of the applications identified in this paragraph are incorporated herein by references.

FIELD

The present invention relates to a method and an apparatus for estimating motion, and more particularly, to a method and an apparatus for estimating motion, capable of processing a plurality of blocks in parallel at the same time according to a detection mode and improving adaptability for a variable block.

BACKGROUND

Due to development in various devices such as digital television (DTV), personal digital assistants (PDA), and cellular phones, interest and needs for multimedia images with high definition. Related thereto, development in image compression technology advantageous in processing speed, power consumption, and magnitude having the same function has been vigorously performed.

A method of displaying a present screen while removing temporal redundancy with a previous screen or a posterior screen is called as compression between screens. For the compression between screens, it is necessary to estimate motion. That is, through motion estimation, a direction and magnitude of motion and an error value between pixels may be found out.

There are two methods of estimating motion. One is a pixel recursive algorithm (PRA), and another is a block matching algorithm. The PRA is a method of estimating motion for each pixel in a present screen, which is scarcely used due to excessive computation. In case of the block matching algorithm, a certain block is assumed as a unit for estimating a motion and all pixels in each block are assumed as making the same motion and then one motion vector is given to one block. However, actually, since all pixels in the block do not make the same motion, an error value between pixels occurs, thereby deteriorating image quality.

A direction and magnitude of motion of a block and an error value between pixels are found through block matching motion estimation and then compression between screens is performed. Herein, the direction and magnitude of motion are called as motion vectors and a total value of motion vectors increases as the block becomes smaller.

Figure 1:
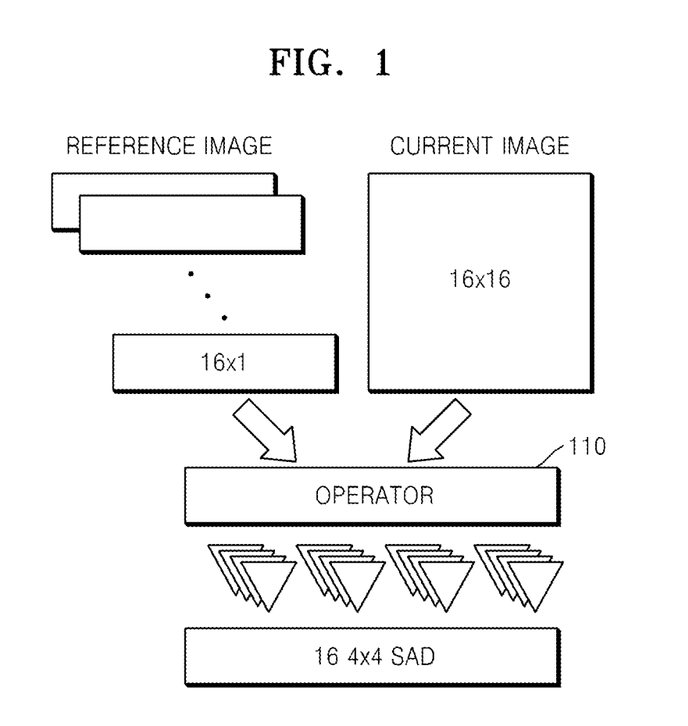
FIG. 1 is a configuration diagram of a general two-dimensional (2D) sum of absolute difference (SAD) operator.

FIG. 1 is a configuration diagram of a general two-dimensional (2D) sum of absolute difference (SAD) operator.

Referring to FIG. 1, in case of a present and a reference image, data of 16×1 pixels (128 bit) is transferred for each one cycle. The data transferred described above is stored in a register file during 16 cycles and gets ready for being transferred to an operator 110. When being stored over 16 cycles and information on a 16×16 macro block is all stored, the present image and the reference image are transferred to the operator 110 to start an operation. The operator 110, in order to operate 256 pixels of 16×16 macro block, performs and reconstructs the operation including 256 process elements (PE) into an SAD value of 4×4 mode using an operation result.

However, when using the 2D SAD operator of FIG. 1 described above, in order to perform a detection algorithm using a pattern with navigation points spanning a wide region, a plurality of commands are executed and processed to perform, which is disadvantageous. This shows a limit in a structure of the 2D SAD operator supporting only an operation for n number of sequential points in a horizontal direction.

DETAILED DESCRIPTION

Technical Problem

The present invention provides a motion estimation apparatus capable of processing a plurality of blocks in parallel at the same time according to a detection mode in response to a command and efficiently performing an operation by improving adaptability for a variable block.

The present invention provides a motion estimation method capable of processing a plurality of blocks in parallel at the same time according to a detection mode in response to a command and efficiently performing an operation by improving adaptability for a variable block.

Technical Solution

According to an embodiment of the present invention, there is provided a motion estimation apparatus including a first register storing information on whether to detect first detection positions through masking and number information of valid first detection positions, a second register storing information on distances from a detection starting position to second detection positions and number information of valid distance information, a controller receiving a command including information on the detection starting position and generating a shift-enable signal, a selection signal, and a progress element group (PEG)-enable signal referring to one of the first register and the second register for the information thereof according to the received command, a shifter, in response to the shift-enable signal, shifting and outputting reference data in a detection region of a reference frame and outputting the received reference data as it is, a selector, in response to the selection signal, selecting and outputting a part of output data of the shifter or outputting the whole output data, a process element (PE) array receiving current data of a current frame and, in response to the PEG-enable signal, including a plurality of PEGs operating current data and output data of the selector in parallel, and a comparator generating operation results for respective block sizes using operation results of the plurality of PEGs, comparing the operation results for the respective block sizes with one another, and outputting an optimum operation value and a motion vector.

The PEGs, in response to the PEG-enable signal, may operate a sum of absolute difference (SAD) between the current data and the output data of the selector in parallel and may output the SAD. The information on whether to detect may be one of information in a logic state, stored in a point corresponding to a pixel requiring detection and information in a second logic state, stored in a point corresponding to a pixel not requiring detection among pixels in the reference data in the detection region.

The distance information may be a number of pixels in a horizontal direction from a pixel corresponding to information on the detection starting position among the pixels of the reference data in the detection region to a pixel corresponding to the second detection position. The command may include information on the detection starting position, a detection mode, and magnitude of operation. The information on the detection mode may include one of first mode information and second mode information depending on one of a distance between the first detection positions and a distance between the second detection positions.

The controller may refer to the first register for the information thereof when the information on the detection mode includes the first mode information and may refer to the second register for the information thereof when the information on the detection mode includes the second mode information.

The information on the detection mode may include the first mode information when the distance between the first detection positions is smaller than a reference distance value and may include the second mode information when the distance between the second detection positions is greater than or identical to the reference distance value.

The shifter may be disabled to output inputted data as it is when the command includes the first mode information and may be enabled when the command includes the second mode information, and the selector and the PEGs may be enabled until operation with respect to the first detection positions is completed when the command includes the first mode information and may be enabled until operation with respect to the second detection positions is completed when the command includes the second mode information.

The controller may generate the shift-enable signal to disable the shifter when the command includes the first mode information and generates the shift-enable to enable the shifter when the command includes the second mode information and may generate the selection signal to enable the selector and the PEG-enable signal to enable the PEG when the PEG operates according to one of the information of the first register and the information of the second register and generates the selection signal to disable the selector and the PEG-enable signal to disable the PEG when the PEG completes operation.

The apparatus may perform operation in response to the one command and may output the optimum operation value and the motion vector. The information on the detection starting position may be one of position information on a point where a next detection starts, which is determined based on an optimum point of a previous operation, and position information applied from the outside.

According to another embodiment of the present invention, there is provided a motion estimation method including receiving a command including information on a detection starting position, current data of a current frame, and reference data in a detection region of a reference frame, determining a detection mode of the received command, operating, when the received command relates to a first mode, the current data and the reference data in parallel using information on whether to detect first detection positions through masking and number information of valid first detection positions, operating, when the received command relates to a second mode, the current data and the reference data in parallel using information on distance information from the detection starting position to second detection positions and number information of valid distance information, and generating operation results for respective block sizes using a plurality of operation results in the above, comparing the operation results for respective block sizes, and generating and outputting an optimum operation value and a motion vector in each position.

Advantageous Effects

According to the embodiments, in a method and apparatus for estimating motion, a plurality of blocks are processed in parallel at the same time according to a detection mode in response to a command, thereby efficiently performing an operation according to a square detection pattern close to a original detection point or a detection pattern with patterns spanning a wide region and easily performing an operation for a variable block.

BRIEF DESCRIPTION OF THE DRAWINGS

To fully understand the drawings referred in a detailed description, a brief description of the respective drawings will be provided as follows.

MODE FOR CARRYING OUT THE INVENTION

To fully understand advantages in operation of the present invention and objects achieved by embodiments of the present invention, it is necessary to refer the attached drawings illustrating exemplary embodiments of the present invention and contents disclosed in the drawings.

Hereinafter, the exemplary embodiments of the present invention will be described in detail with reference to the attached drawings. In the drawings, like reference numerals refer to like elements.

Figure 2:
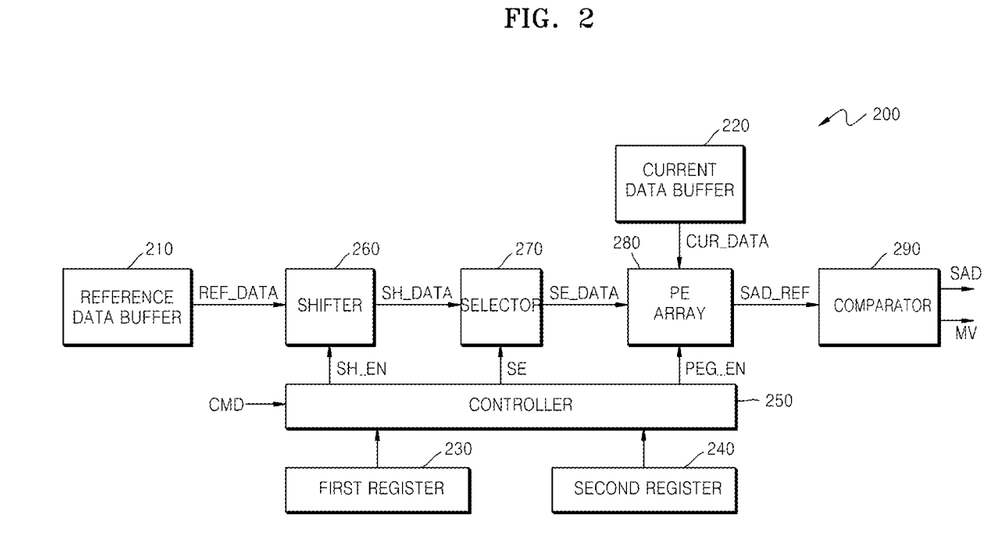
FIG. 2 is a block diagram of a motion estimation apparatus according to an embodiment of the inventive concept.

FIG. 2 is a block diagram of a motion estimation apparatus 200 according to an embodiment of the inventive concept.

Referring to FIG. 2, the motion estimation apparatus 200 may include a reference data buffer 210, a current data buffer 220, a first register 230, a second register 240, a controller 250, a shifter 260, a selector 270, a process element (PE) array 280, and a comparator 290. The motion estimation apparatus 200 may be a two-dimensional (2D) sum of absolute difference (SAD) operator having a new configuration.

The reference data buffer 210 may receive reference data in a detection region of a reference frame. The current data buffer 220 may receive current data of a present frame.

The first register 230 may store information on whether first detection positions are detected through masking and information on a number of valid detection positions. The information on whether the first detection positions are detected using the mask method may be stored as to have a different logic state depending on whether the reference data in the detection region of the reference frame is a desirable position or not. For example, in a point of the first register 230 corresponding to a one requiring detection among pixels in the reference data in the detection region, information in a first logic state may be stored. In a point of the first register 230 corresponding to an undesirable one among the pixels in the reference data in the detection region, information in a second logic state may be stored. The information of the first logic state may be in a logic-high state, and the information of the second logic may be in a logic-low state. Merely, not limited thereto, the first logic state and the second logic state may have a contrary state. The information on the number of the valid first detection positions may mean information on number of positions to be detected among the first detection positions. For example, when the information of the first logic state is stored in the point of the first register 230 corresponding to the one requiring detection among the pixels of the reference data in the detection region, a number of pieces of information in the first logic state may be information on the number of the valid first detection positions. The first register 230 will be described in detail with reference to FIGS. 3 and 4.

The second register 240 may store information on distances from a detection starting position to second detection positions and information on a number of valid distances. The distance information may mean information on a distance between a position for starting detection and a position requiring detection among the reference data in the detection region of the reference frame. For example, it may mean a number of pixels from a pixel corresponding to the detection starting position to a pixel requiring detection in a horizontal direction among the pixels of the reference data in the detection region. Information on the detection starting position may be position information on a point where detection starts after being determined based on an optimal point according to a previous operation or position information applied from the outside. That is, according to the embodiment, when performing phased detection, a starting point is reset based on an optimal point as a result of a previous operation and the detection is performed repetitively. In this case, an operation for a point where following detection starts is performed and information on the point where the following detection starts may be stored as the information on the detection starting position in the second register. The information on the number of valid distances may mean information on a number of pieces of valid distance information among the information stored in the second register 240. That is, it may indicate distance information from the detection starting position to the second detection positions requiring detection among the distance information. The second register 240 will be described in detail with reference to FIGS. 5 and 6.

The controller 250 may receive a command CMD including the information on the detection starting position and may generate a shift-enable signal SH-EN, a selection signal SE, and a PEG-enable signal PEG-EN by referring to the first register 230 for the information stored therein or the second register 240 for the information stored therein.

The command CMD may include information on at least one of the detection starting position, a detection mode, and operation magnitude. The information on the detection mode may include information on a first mode (hereinafter, referred to as first mode information) or information on a second mode (hereinafter, second mode information) according to a distance between the first detection positions or a distance between the second detection positions. For example, the information on the detection mode may include the first mode information when the distance between the first detection positions is smaller than a reference distance value or may include the second mode information when the distance between the second detection positions is greater than or identical to the reference distance value. The reference distance value may be arbitrarily determined to be smaller or greater according to necessity.

For example, when the detection pattern is a square shape with the first detection positions being closed to an original detection point, the information on the detection mode may include the first mode information. That is, since information on whether all first detection positions stored in the first register are to be detected is used in case of the first mode, when there are a large number of positions to be detected in a small region, the first mode may be applied.

As another example, in case of the detection pattern with the second detection positions spanning in a wide region, the information on the detection mode may include the first mode information. That is, since the distance information stored in the second register is used in the second mode, when positions to be detected are spaced with certain intervals in a wide region, the second mode may be applied.

A case, in which the received command CMD relates to the first mode, will be described. In this case, the controller 250 may generate the shift-enable signal SH_EN disabling the shifter 260 referring to the first register 230 for the information therein. Also, when progress element groups (PEG) included in the PE array 280 operate according to the information on whether the first register 230 is detected, the selection signal SE enabling the selector 270 and the PEG-enable signal PEG_EN enabling the PEG may be generated. When the PEG complete the operation, the selection signal SE disabling the selector 270 and the PEG-enable signal PEG_EN disabling the PEG may be generated.

A case, in which the received command CMD relates to the second mode, will be described. In this case, the controller 250 may generate the shift-enable signal SH_EN disabling the shifter 260 referring to the second register 240 for the information therein. Also, when the PEG included in the PE array 280 operate according to the distance information, the selection signal SE enabling the selector 270 and the PEG-enable signal PEG_EN enabling the PEG may be generated. When the PEG complete the operation, the selection signal SE disabling the selector 270 and the PEG-enable signal PEG_EN disabling the PEG may be generated. An operation when the shifter 260, the selector 270, and the PE array 280 are enabled or disabled will be described in detail.

When being enabled in response to the shift-enable signal SH_EN, the shifter 260 may shift and output reference data REF_DATA in the detection region of the reference frame received from the reference data buffer 210. That is, when the motion estimation apparatus 200 detects a discontinuous point as the second mode and operates, the shifter 260 is enabled in response to the shift-enable signal SH_EN, thereby shifting and outputting the reference data REF_DATA. Also, when being disabled in response to the shift-enable signal SH_EN, the shifter 260 may output reference data REF_DATA in the detection region of the reference frame received from the reference data buffer 210 without shifting. That is, when the motion estimation apparatus 200 detects a continuous point as the first mode and operates, the shifter 260 is disabled in response to the shift-enable signal SH_EN, thereby outputting the reference data REF_DATA without shifting.

When being enabled in response to the selection signal SE, the selector 270 may select and output part of output data SH_DATA of the shifter 260. That is, when the motion estimation apparatus 200 detects the discontinuous point as the second mode and operates, the selector 270 may selectively output reference data SE_DATA necessary for operation of the PEGs among the reference data SH_DATA shifted by the shifter 260 in response to the selection signal SE. Otherwise, when the motion estimation apparatus 200 detects a continuous point as the first mode and operates, the selector 270 may select and output reference data SH_DATA outputted without shifting by the shifter 260 in response to the selection signal SE. When the PEG completes operation, the selector 270 may be disabled in response to the selection signal SE.

The PE array 280 may include a plurality of PEGs, for example, may include n (n is a natural number greater than 2) number of the PEGs to operate n number pixels in a horizontal direction for each line among the current data and n number of pixels in a horizontal direction for each line among the reference data in the detection region in parallel.

When being enabled in response to the PEG-enable signal PEG_EN, the PEGs may operate the current data CURR_DATA received from the current data buffer 220 and the output data SE_DATA of the selector 270 received from the selector 270 in parallel. That is, when the motion estimation apparatus 200 detects the discontinuous point as the second mode and operates, the PEGs enabled in response to the PEG-enable signal PEG_EN may operate the reference data SE_DATA selected by the selector 270 among the reference data SH_DATA shifted by the shifter 260 and the current data CURR_DATA in parallel. Otherwise, when the motion estimation apparatus 200 detects the continuous point as the first mode and operates, the PEGs enabled in response to the PEG-enable signal PEG_EN may operate the reference data SE_DATA not shifted by the shifter 260 and selected by the selector 270 among the reference data REF_DATA and the current data CURR_DATA in parallel. When the PEGs complete operation and there is no data to be operated, the PEGs may be disabled in response to the PEG-enable signal PEG_EN.

For example, the PEGs may operate a SAD between the current data CURR_DATA and the output data SE_DATA of the selector 270. Merely, the PEGs are not only to operate the SAD operation and may use other operation methods for estimating motion, for example, cross-correlation function (CCE), means square error (MSE), and mean absolute error (MAE). A configuration and operation of the PEG will be described in detail with reference to FIG. 7.

The comparator 290 may generate operation results for respective block sizes using operation results SAD_REF operated and outputted by the PEGs of the PE array 280 in parallel at the same time and may compare the operation results for respective block sizes, thereby outputting an optimal SAD operation value and a motion vector MV. The comparator 290 will be described in detail with reference to FIG. 8.

Figure 3:
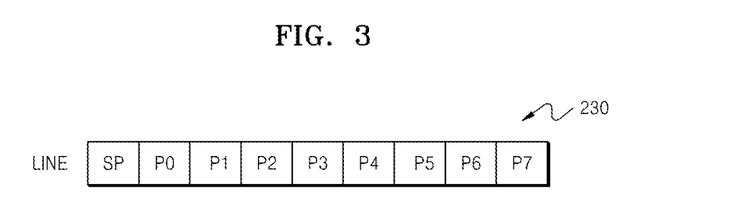
FIG. 3 is a diagram of a first register of FIG. 2, storing information corresponding to one line of reference data.

FIG. 3 is a diagram of the first register 230 of FIG. 2 storing information corresponding to one line of reference data.

Figure 4:
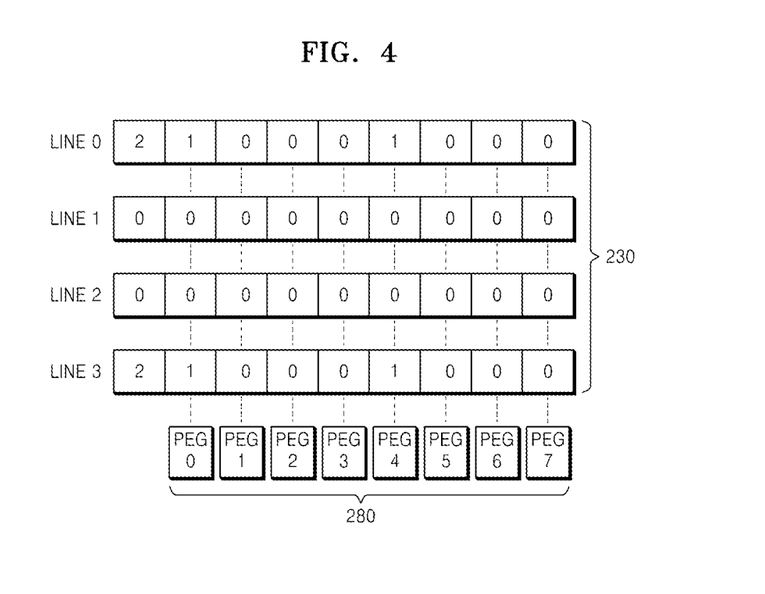
FIG. 4 is a view of the first register of FIG. 2, storing information corresponding to a plurality of lines of the reference data and a PE array including corresponding PEGs.

Referring to FIGS. 2 and 3, as described above with reference to FIG. 2, the first register 230 may store number information of the valid detection positions for each line of the reference data and information on whether the first detection positions are to be detected (P0, P1, P2, P3, P4, P5, P6, and P7). FIG. 3 illustrates only one line as an example. However, as shown in FIG. 4, information corresponding to each of a plurality of lines may be stored. The detection position information stored through masking will be described in detail with reference to FIG. 4.

FIG. 4 is a view of the first register 230 of FIG. 2, storing information corresponding to a plurality of lines of reference data and the PE array 280 including corresponding PEGs.

Referring to FIGS. 2 to 4, FIG. 4 illustrates a case, in which a point corresponding to a position requiring detection is stored with 1 that is information on whether to detect and a point corresponding to a position not requiring detection is stored with 0 that is information on whether to detect. Merely, not limited thereto, depending on whether a position requires detection, information on whether to detect having a contrary logic state may be stored or information on whether to detect having another value may be stored.

In FIG. 4, it may be known that a number of valid detection positions in a line LINE0 of the reference data is 2, a pixel in a detection starting position of the line LINE0 and a pixel in a position 4 pixels from the pixel in the detection starting position of the line LINE0 are positions requiring detection. Also, it may be known that a number of valid detection positions in a line LINE3 of the reference data is 2, a pixel in a detection starting position of the line LINE3 and a pixel in a position 4 pixels from the pixel in the detection starting position of the line LINE3 are positions requiring detection. Also, it may be known that lines LINE1 and LINE2 of the reference data do not have positions requiring detection.

Also, as described above with reference to FIG. 2, PEGs of the PE array 280 such as PEG0, PEG1, PEG2, PEG3, PEG4, PEG5, PEG6, and PEG 7, in order to operate pixels in a horizontal direction for each line of the reference data in parallel, as shown in FIG. 4, the PEGs may operate in corresponding positions among the lines of the reference data, respectively. For example, in FIG. 4, when performing operation related to the lines LINE0 and LINE3 of the reference data, the PEGs PEG0 and PEG4 may be enabled to perform the operation.

Accordingly, in order to display square detection patterns within a short distance from an original detection point, it is effective to use information of the first register 230.

Figure 5:
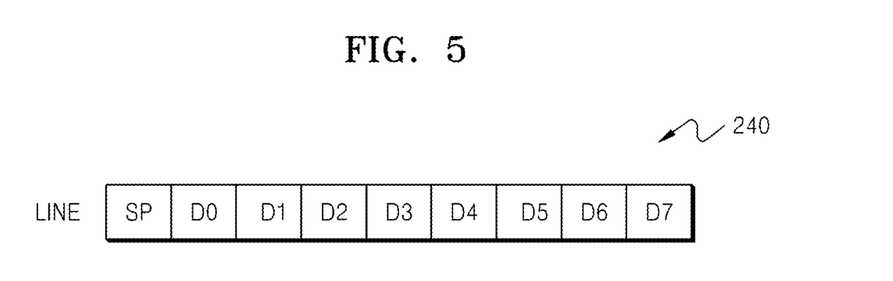
FIG. 5 is a diagram of a second register of FIG. 2, storing information corresponding to one line of reference data.

FIG. 5 is a diagram of the second register 240 storing information corresponding to one line of reference data.

Referring to FIGS. 2 and 5, as described above with reference to FIG. 2, the second register 240 may store number information of valid distances for each line of the reference data and distance information from the detection starting position such as D0, D1, D2, D3, D4, D5, D6, and D7. FIG. 5 illustrates only one line as an example. However, as shown in FIG. 6, information corresponding to each of a plurality of lines may be stored.

Figure 6:
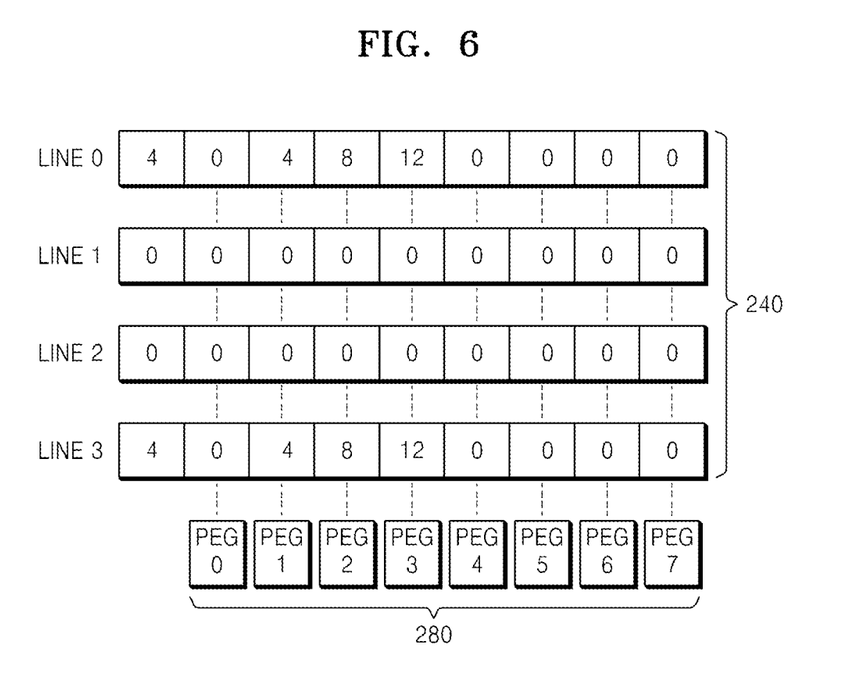
FIG. 6 is a view of the second register of FIG. 2, storing information corresponding to a plurality of lines of the reference data and a process element (PE) array including corresponding PEGs.

FIG. 6 is a view of the second register 240 of FIG. 2, storing information corresponding to a plurality of lines of reference data and the PE array 280 including corresponding PEGs.

Referring to FIGS. 2, 5, and 6, in FIG. 6, it may be known that a number of valid detection positions in a line LINE0 of the reference data is 4, pixels in positions 0, 4, 8, and 12 pixels from a pixel in the detection starting position of the line LINE0 are positions requiring detection. Also, it may be known that a number of valid detection positions in a line LINE3 of the reference data is 4, pixels in positions 0, 4, 8, and 12 pixels from a pixel in the detection starting position of the line LINE3 are positions requiring detection. Also, it may be known that lines LINE1 and LINE2 of the reference data do not have positions requiring detection.

Also, as described above with reference to FIG. 2, PEGs of the PE array 280 such as PEG0, PEG1, PEG2, PEG3, PEG4, PEG5, PEG6, and PEG 7, in order to operate pixels in a horizontal direction for each line of the reference data in parallel, as shown in FIG. 6, the PEGs may operate in corresponding positions among the lines of the reference data, respectively. The PEGs PEG0, PEG1, PEG2, PEG3, PEG4, PEG5, PEG6, and PEG 7 of the PE array 280 are the same elements as the PEGs PEG0, PEG1, PEG2, PEG3, PEG4, PEG5, PEG6, and PEG 7 of the PE array 280 shown in FIG. 4, which may operate selectively as described above with reference to FIG. 4 or may operate as described above with reference to FIG. 6. For example, in FIG. 6, when performing operation related to the lines LINE0 and LINE3 of the reference data, the PEGs PEG1, PEG2, and PEG3 may be enabled to perform the operation.

Accordingly, in order to display square detection patterns spanning in a wide region, it is effective to use information of the second register 240.

Figure 7:
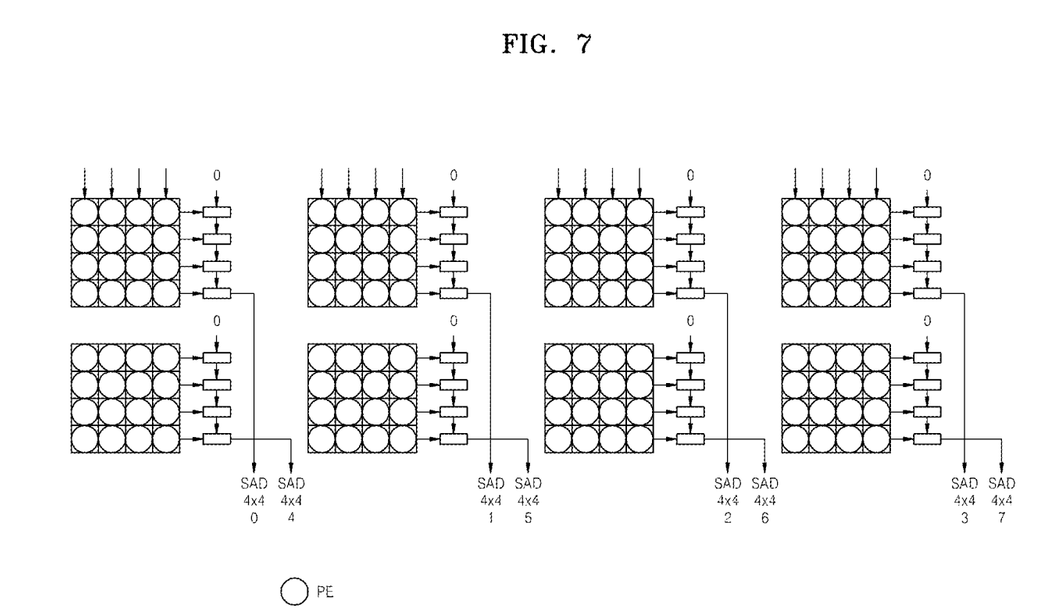
FIG. 7 is a view of an example of the PE array of FIG. 2.

FIG. 7 is a view of an example of the PE array 280 of FIG. 2.

Referring to FIGS. 2 and 7, a circle of FIG. 7 may mean one PE and PEG may include a plurality of PEs. For example, the PEG may include a block where 16 PEs are gathered. Merely, not limited thereto, the block may include other numbers of PEs.

For example, a command CMD may process to maximum 8 points in a horizontal direction and 16 points in a vertical direction. For this, totally 8 PEGs may process 8 points in the horizontal direction at 2 cycles. Also, operation with respect to a point in the vertical direction may be performed by receiving data in series. During 16 cycles from a point in time when being inputted into the motion estimation apparatus 200, the current data and the reference data are inputted into the reference data buffer 210 and the current data buffer 220. After that, for every two cycles, the PE array 280 outputs operations values for 8 points and may sequentially operate a result with respect to 128 points to maximum.

A horizontal direction motion vector may be calculated using information on a detection starting position and distance information of an operation point for each PEG and is formed by increasing a vertical direction motion vector whenever every two cycles increases. The motion vector formed as described above may be synchronized with an operation value of each point, which is output data, and may be transferred to the comparator 290.

Figure 8:
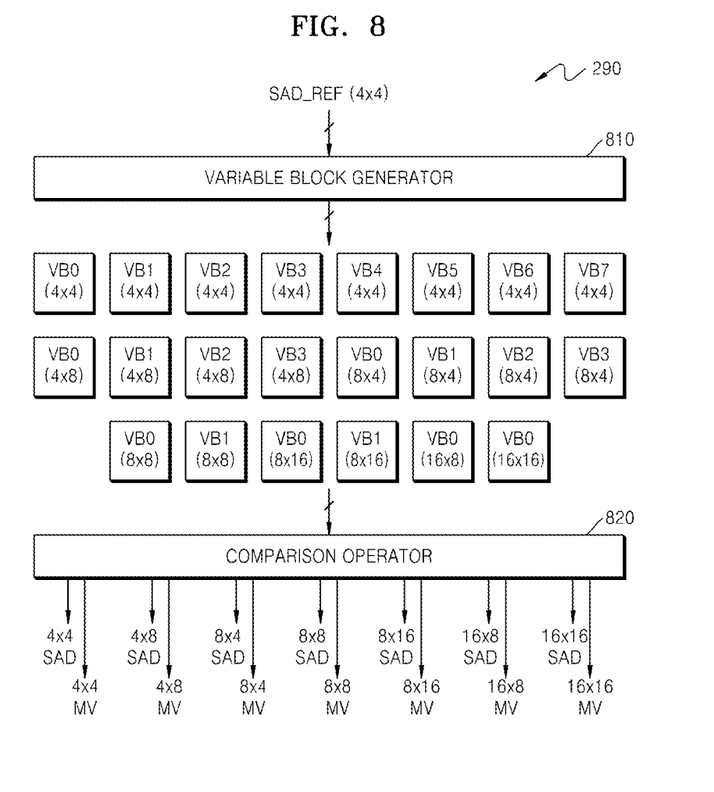
FIG. 8 is a view of an example of a comparator of FIG. 2.

FIG. 8 is a view of an example of the comparator 290 of FIG. 2.

Referring to FIGS. 2 and 8, the comparator 290 may include a variable block generator 810 and a comparison operator 820. The variable block generator 810 may generate operations results for respective block sizes, that is, operations results of blocks having various sizes using operations results outputted from the PEGs. The comparison operator 820 may compare the operations results for the respective block sizes outputted from the variable block generator 810 with one another and may output an optimum operation value and a motion vector in each position.

For example, when each PEG generates 8 SAD values with respect to 4×4 mode, on a 16×16 macro block basis, upper 8 4×4 operation values, for example, SAD values may be generated in a first cycle and lower 8 4×4 operation values, for example, SAD values may be generated in a second cycle, which may be inputted into the comparator 290. The comparator 290 may form variable blocks based on sequentially inputted 4×4 SAD values using the variable block generator 810. When data inputted into the comparator 290 differs depending on a cycle, a variable block generated by the variable block generator 810 may be divided according to the cycle. Classifying the variable blocks, variable blocks, which may be formed in the first cycle, are 8 4×4 blocks, 4 4×8 blocks, 4 8×4 blocks, 2 8×8 blocks, and one 16×8 block and variable blocks, which may be formed in the second cycle, are 8 4×4 blocks, 4 4×8 blocks, 4 8×4 blocks, 2 8×8 blocks, one 16×8 block, 2 8×16 blocks, and one 16×16 block. Accordingly, except the comparison operators 820 of 8×16 and 16×16 blocks, the comparison operators 820 of other modes may be used while distinguishing and sharing the cycle.

Accordingly, the respective comparison operators 820 may compare detection point values of overall 8 points of detection for each position of the variable block and may output an optimum operation value and a motion vector of a point having an optimum value.

Figure 9:
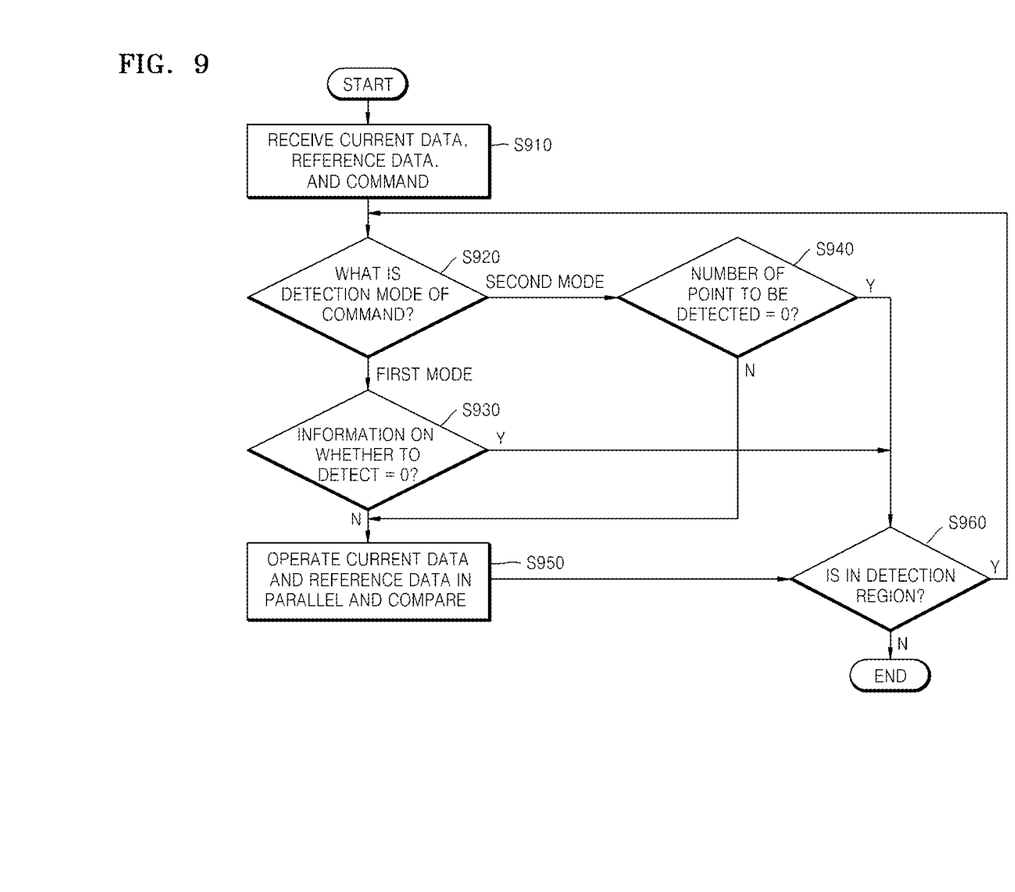
FIG. 9 is a flowchart illustrating a motion estimation method according to an embodiment of the inventive concept.

FIG. 9 is a flowchart of a motion estimation method according to an embodiment of the inventive concept.

Referring to FIGS. 2 to 9, the reference data buffer 210 may receive reference data in a detection region of a reference frame, the current data buffer 220 may receive current data of a current frame, and the controller 250 may receive a command CMD including information on a detection starting position (S910). It may be determined whether a detection mode of the received command CMD is a first mode or a second mode (S920). When the detection mode of the receive command is the first mode, operation S930 may be performed. When the detection mode of the received command is the second mode, operation S940 may be performed.

When the detection mode of the received command is the first mode, it is determined using information on whether to detect first detection positions and number information of valid first detection positions whether it is a position requiring detection (S930). When the information on whether to detect displays that a position requires detection, using the information on whether to detect the first detection positions and the number information of the valid first detection positions stored in the first register 230, PEGs of the PE array 280 may operate the current data and the reference data in parallel, the comparator 290 may generate operation results for respective block sizes using a plurality of operation results, may compare operation values for the respective block sizes with one another, and may generate and output an optimum operation value and a motion vector in each position (S950). When the information on whether to detect displays that a position does not require detection, it is determined whether a present detection point is in a detection region (S960). When the present detection point is in the detection region, the operation S920 is performed.

When the detection mode of the received command is a second mode, using distance information from a detection starting position to second detection positions and number information of valid distance information stored in the second register 240, it is determined whether a point to be detected is present (S940). When the point to be detected is present, using the distance information from the detection starting position to the second detection positions and the number information of valid distance information stored in the second register 240, the PEGs of the PE array 280 may operate the current data and the reference data in parallel, the comparator 290 may generate operation results for respective block sizes using a plurality of operation results, may compare operation values for the respective block sizes with one another, and may generate and output an optimum operation value and a motion vector in each position (S950). When the point to be detected is not present, it is determined whether the present detection point is in the detection region (S960). When the present detection point is in the detection region, the operation S920 is performed.

Since the operations of the controller 250, the shifter 260, and the selector 270 to process the reference data according to respective detection modes, the operation of the PE array 280 to operate the reference data and the current data, and the operation of the comparator 290 to compare the plurality of operation results with one another and to output the optimum operation value and the motion vector have been described in detail with reference to FIGS. 2 to 8, a detailed description will be omitted hereinafter.

As described above, according to the embodiment, information of a register to be referred to is determined using one command and operation is performed referring to the determined register for information thereof, thereby outputting an optimum operation value and a motion vector using the one command, which allows efficient operation.

The invention claimed is:

1. A motion estimation apparatus comprising:
a first register storing information on whether to detect first detection positions through masking and number information of valid first detection positions;
a second register storing information on distances from a detection starting position to second detection positions and number information of valid distance information;
a controller receiving a command including information on the detection starting position and generating a shift-enable signal, a selection signal, and a progress element group (PEG)-enable signal referring to one of the first register and the second register for the information thereof according to the received command;
a shifter, in response to the shift-enable signal, shifting and outputting reference image or video data in a detection region of a reference frame and outputting the received reference image or video data as it is;
a selector, in response to the selection signal, selecting and outputting a part of output image or video data of the shifter or outputting the whole output image or video data;
a process element (PE) array receiving current image or video data of a current frame and, in response to the PEG-enable signal, including a plurality of PEGs operating current image or video data and output image or video data of the selector in parallel;
and a comparator generating operation results for respective block sizes using operation results of the plurality of the PEGs, comparing the operation results for the respective block sizes with one another, and outputting an optimum operation value and a motion vector.

2. The apparatus of claim 1, wherein the PEGs, in response to the PEG-enable signal, operates a sum of absolute difference (SAD) between the current image or video data and the output image or video data of the selector in parallel and outputs the SAD.

3. The apparatus of claim 1, wherein the information on whether to detect is one of information in a logic state, stored in a point corresponding to a pixel requiring detection and information in a second logic state, stored in a point corresponding to a pixel not requiring detection among pixels in the reference image or video data in the detection region, and wherein the distance information is a number of pixels in a horizontal direction from a pixel corresponding to information on the detection starting position among the pixels of the reference image or video data in the detection region to a pixel corresponding to the second detection position.

4. The apparatus of claim 1, wherein the command comprises information on the detection starting position, a detection mode, and magnitude of operation, wherein the information on the detection mode comprises one of first mode information and second mode information depending on one of a distance between the first detection positions and a distance between the second detection positions, and wherein the first register is referred to for the information thereof when the information on the detection mode comprises the first mode information and the second register is referred to for the information thereof when the information on the detection mode comprises the second mode information.

5. The apparatus of claim 4, wherein the information on the detection mode comprises the first mode information when the distance between the first detection positions is smaller than a reference distance value and comprises the second mode information when the distance between the second detection positions is greater than or identical to the reference distance value.

6. The apparatus of claim 4, wherein the shifter is disabled to output inputted image or video data as it is when the command comprises the first mode information and is enabled when the command comprises the second mode information, and wherein the selector and the PEGs are enabled until operation with respect to the first detection positions is completed when the command comprises the first mode information and are enabled until operation with respect to the second detection positions is completed when the command comprises the second mode information.

7. The apparatus of claim 4, wherein the controller generates the shift-enable signal to disable the shifter when the command comprises the first mode information and generates the shift-enable to enable the shifter when the command comprises the second mode information, and wherein the controller generates the selection signal to enable the selector and the PEG-enable signal to enable the PEG when the PEG operates according to one of the information of the first register and the information of the second register and generates the selection signal to disable the selector and the PEG-enable signal to disable the PEG when the PEG completes operation.

8. The apparatus of claim 4, wherein the comparator performs operation in response to the one command and outputting the optimum operation value and the motion vector.

9. The apparatus of claim 1, wherein the information on the detection starting position is one of position information on a point where a next detection starts, which is determined based on an optimum point of a previous operation, and position information applied from the outside.

10. A motion estimation method comprising:
receiving a command comprising information on a detection starting position, current image or video data of a current frame, and reference image or video data in a detection region of a reference frame;
determining a detection mode of the received command;
operating, when the received command relates to a first mode, the current image or video data and the reference image or video data in parallel using information on whether to detect first detection positions through masking and number information of valid first detection positions;
operating, when the received command relates to a second mode, the current image or video data and the reference image or video data in parallel using information on distance information from the detection starting position to second detection positions and number information of valid distance information; and
generating operation results for respective block sizes using a plurality of operation results in the above, comparing the operation results for respective block sizes, and generating and outputting an optimum operation value and a motion vector in each position.

11. The method of claim 10, wherein the operations of operating in parallel comprise operating SAD between the current image or video data and the reference image or video data and outputting the SAD.

12. The method of claim 10, wherein the information on whether to detect is one of information in a logic state, stored in a point corresponding to a pixel requiring detection and information in a second logic state, stored in a point corresponding to a pixel not requiring detection among pixels in the reference image or video data in the detection region, and wherein the distance information is a number of pixels in a horizontal direction from a pixel corresponding to information on the detection starting position among the pixels of the reference image or video data in the detection region to a pixel corresponding to the second detection position.

13. The method of claim 10, wherein the command comprises information on the detection starting position, a detection mode, and magnitude of operation, and wherein the information on the detection mode comprises one of first mode information and second mode information depending on one of a distance between the first detection positions and a distance between the second detection positions.

14. The method of claim 13, wherein the information on the detection mode comprises the first mode information when the distance between the first detection positions is smaller than a reference distance value and comprises the second mode information when the distance between the second detection positions is greater than or identical to the reference distance value.

15. The method of claim 13, wherein the generating and outputting the optimum operation value and the motion vector in each position performs operation in response to the one command and outputting the optimum operation value and the motion vector.

16. The method of claim 10, wherein the information on the detection starting position is one of position information on a point where a next detection starts, which is determined based on an optimum point of a previous operation, and position information applied from the outside.

* * * * *